UNITED STATES PATENT OFFICE.

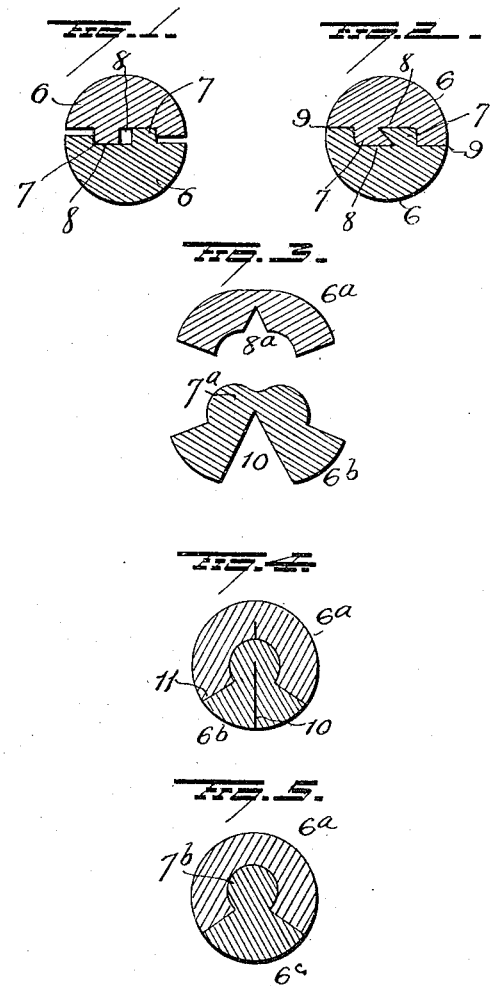

ETHAN I. DODDS, OF PITTSBURGH, PENNSYLVANIA, ASSIGNOR TO FLANNERY BOLT COMPANY, OF PITTSBURGH, PENNSYLVANIA.

METHOD OF MANUFACTURING BARS FOR BOLT-BLANKS.

1,205,174.  Specification of Letters Patent.  Patented Nov. 21, 1916.

Application filed June 15, 1915. Serial No. 34,267.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Methods of Manufacturing Bars for Bolt-Blanks; and I do hereby declare the following to be a full, clear, and exact description of the invention, such as will enable others skilled in the art to which it appertains to make and use the same.

My invention relates to an improvement in the method of manufacturing bars for bolt blanks, the object being to simplify the process of manufacturing the blanks whereby the cost of production of the bolts will be reduced and the output increased.

The invention consists in providing two semi-cylindrical bars or members with longitudinally arranged rib and groove, whereby when the assembled semi-cylindrical bars are subsequently rolled, the rib or groove or both will be distorted or deformed, thus locking the two members together and forming a cylindrical bar which will be of the same tensile strength as an integral bar of the same cross sectional area, but more flexible than a rigid bar.

In the accompanying drawings, Figure 1 is a view in cross section of the two members assembled but not united; Fig. 2 is a similar view after they have been rolled, and Figs. 3, 4 and 5 are views of modified forms.

In the manufacture of the bar I take two semi-cylindrical sections 6, one of which has a rib and the other a groove, as shown in Figs. 3, 4, and 5, or preferably two semi-cylindrical bars each of which has a rib 7 and a groove 8 as shown in Figs. 1 and 2, the ribs and grooves extending throughout the length of the bars. In the construction shown in Figs. 1 and 2 the ribs 7 are deeper than the grooves and project beyond the flat, inner or meeting faces of the bars 6, and are so located that when the two bars are assembled, they will be side by side. Each rib rests on the floor of the groove in the other bar thus holding the inner or meeting faces of the two bars slightly separated as shown in Fig. 1. By now passing the bars thus assembled between rolls, the ribs 7 being structurally weaker than the bodies of the bars will be crushed and deformed and spread out within the grooves and fill the latter and as the crushing effect on each rib is toward the other rib they will interlock as shown in Fig. 1. This distortion of the ribs permits the meeting faces of the two bars 6 to come into contact with each other without welding, thus forming a compound bar circular in cross section with two oppositely disposed longitudinal slits 9 extending throughout the length of the bar. A bar thus formed is of the same tensile capacity as a solid bar of the same cross sectional area, but is more flexible, which adapts it particularly for the manufacture of blanks for stay bolts for boilers and also for bolts used in railway track construction. After the bar has been thus formed, it may be twisted longitudinally from end to end so that the two slits will be in the form of spirals extending from end to end of the bar.

To make bolts from the compound bar, the latter is reheated and is fed to a machine which upsets the head and cuts off the blank. By twisting the bar from which the bolts are cut, the twist will be constant and uniform from end to end and consequently uniform in the blanks that are cut from the bar. The upsetting of the heads welds the walls of the slits at the heads, but leaves the walls of the slits in the shank disconnected thus permitting the shank to yield or give under certain stresses.

In Fig. 3 one bar 6ª is provided with a curved outer face and a centrally located longitudinal groove 8ª on its inner face, and the other bar 6ᵇ is centrally slitted longitudinally as at 10, and curved on its outer face and provided on its inner or meeting face with a compound curved rib 7ª extending throughout its length.

To assemble the parts the bar 6ª is placed on the bar 6ᵇ, with the rib 7ª of the latter within the groove 8ª of the former, and is passed between rolls which close the slit 10, thus converting the compound curved rib into an arc shaped rib greater than half a circle and closing the bar 6ª over said rib, thus forming a cylindrical bar composed of two members permanently secured together without welding. By this method of manufacture, a slit 11 is formed between each edge of the bar 6ª and the shoulders on bar 6ᵇ with which said edges abut and also by the slit 10. If desired this slit 10 may be omitted as shown in Fig. 5. In this construction the bar 6ᶜ, which corresponds to section 6ᵇ of Fig. 3 is made originally with an arc-shaped rib 7ᵇ greater than a half circle so as to interlock with the bar 6ᵃ when the latter is closed onto the same.

Having fully described my invention what I claim as new and desire to secure by Letters-Patent, is:—

1. The method herein described of making bars for bolt blanks consisting in grooving one bar longitudinally and providing another bar with a rib to rest in said groove and then rolling the compound bar thus formed whereby the rib becomes locked in the groove in the other bar, thus forming a compound bar with a plurality of slits extending throughout the length of the latter.

2. The method herein described of making bars for bolt blanks from two bars, consisting in providing each bar with a rib and a groove, assembling the bars so that the rib or each rests in the groove of the other and then rolling the bars to crush the ribs within the grooves whereby the two bars become permanently locked and form a cylindrical bar with a plurality of slits extending lengthwise the same.

3. The method herein described of making bars for bolt blanks consisting in forming two semi-cylindrical bars each with a groove and a rib on its flat side, assembling the bars so that the rib of each rests within the groove in the other and rolling the compound bar whereby the ribs will be deformed and interlock.

In testimony whereof, I have signed this specification in the presence of two subscribing witnesses.

ETHAN I. DODDS.

Witnesses:
F. H. ALLISON,
EDWIN S. RYCE.

Copies of this patent may be obtained for five cents each, by addressing the "Commissioner of Patents, Washington, D. C."